United States Patent [19]

Goyal

[11] Patent Number: 5,114,564
[45] Date of Patent: May 19, 1992

[54] SLUDGE AND OXYGEN QUENCHING IN DELAYED COKING

[75] Inventor: Shri K. Goyal, Naperville, Ill.

[73] Assignee: Amoco Corporation, Chicago, Ill.

[21] Appl. No.: 716,789

[22] Filed: Jun. 18, 1991

[51] Int. Cl.$^5$ .................... C10G 9/14; C10G 11/00
[52] U.S. Cl. .................... 208/131; 208/48 R; 208/50; 201/25
[58] Field of Search .................... 208/131

[56] References Cited

U.S. PATENT DOCUMENTS

| | | | |
|---|---|---|---|
| 2,347,805 | 5/1944 | Bell | 208/50 |
| 3,917,564 | 11/1975 | Meyers | 208/131 |
| 3,960,704 | 6/1976 | Kegler et al. | 208/50 |
| 4,404,092 | 9/1983 | Audeh et al. | 208/131 |
| 4,534,851 | 8/1985 | Allan et al. | 208/48 R |
| 4,874,505 | 10/1989 | Bartilucci et al. | 208/131 |
| 5,009,767 | 4/1991 | Bartilucci t al. | 208/131 |

*Primary Examiner*—Helane E. Myers
*Attorney, Agent, or Firm*—Scott P. McDonald; William H. Magidson; Frank J. Sroka

[57] ABSTRACT

An improved delayed coking process is described in which sludge and oxygen contact hot coke during the quench cycle at conditions which cause at least a portion of the organics contained in the sludge to oxidize. Preferably, a portion of the sludge is combusted and the heat generated is used to help remove, during the quench cycle, entrapped liquids contained in the coke bed and to enhance thermal conversion of hazardous materials contained in the sludge to less harmful materials.

20 Claims, 1 Drawing Sheet

SLUDGE AND OXYGEN QUENCHING IN DELAYED COKING

CROSS-REFERENCE TO RELATED APPLICATION

This application is filed concurrently with U.S. Ser. No. 07/716,790 entitled "Oxygen Addition To A Coking Zone and Sludge Addition With Oxygen Addition", and is copending with U.S. Ser. No. 07/562,260, filed Aug. 3, 1990, entitled "Sludge Addition To A Coking Process."

BACKGROUND OF THE INVENTION

The field of art to which this invention pertains is delayed coking of hydrocarbons and processing of waste sludge in a delayed coking operation. The particular field of art to which this invention pertains is adding sludge and oxygen to a delayed coking process during the quench cycle.

SUMMARY OF THE INVENTION

Coking operations in most modern refineries produce solid coke, vapor, and liquid products from heavy residual oil feedstocks which are fed to the coking process. The most widely used coking process is delayed coking operation.

In the delayed coking process, coking drums are used. A heavy residual oil is heated in a furnace and passed through a transfer line into a coking drum. In the coking drum, which is typically an elongated, cylindrical, vertically positioned vessel with an outwardly convex top and a downwardly converging conical bottom, the residual feedstock is thermally decomposed over time into solid coke and vapor materials. The vapor materials formed during the coking reaction are recovered from the delayed coking drum and a solid coke material is left behind.

The vapor products are removed from the top of the coke drum through a coke drum outlet and passed through a coke drum overhead line which is connected to a fractionator, often called a combination tower. In the combination tower, gaseous and liquid products are recovered for further use in the refinery.

After a period of time, the feed to the coke drum is stopped and routed to another drum, and the coke-laden drum is then purged of vapors and cooled during a quench cycle. After the quench cycle, the solid coke inside the drum is sufficiently cooled to be removed from the drum.

Sludge production from a typical refinery or petrochemical plant can come from many sources including API separator bottoms, slop oil emulsions, storage tank bottoms, sludge from heat exchangers, oily waste, MEA reclaimer sludges, and other waste materials produced in the plant. The typical refinery sludge will contain solids, which may be organic, inorganic or combinations of both, along with oil, liquid and aqueous materials. Sometimes the sludge contains predominantly liquid materials and can be in the form of an emulsion.

In most refinery or petrochemical operations the sludge is often sent to a separator for gross removal of water and hydrocarbons, after which the water and concentrated hydrocarbons and solids can be individually treated by landfarming or further biological or other known waste treatment means.

Landfarming of sludges is being phased out of use through regulation. Additional disposal methods such as land filling are also tightly regulated which adds additional costs to the disposal of sludges. This problem becomes more exacerbated when the sludges contain toxic or hazardous components which require special permitting for disposal.

One method of sludge disposal is to add sludge to a delayed coker during the quench cycle along with liquid cooling water. The hot solid coke that the sludge and water mixture contacts causes vaporization of the water and sludge volatiles. The dispersed organics and solids in the sludge are deposited on the coke which is eventually removed from the coke drum to be used as fuel. This process is exemplified in U.S. Pat. No. 3,917,564 referred to below.

A major problem associated with the aboe process is that the sludge and liquid water addition must be stopped at a point in the quench cycle when the temperature of the solid coke in the coke drum is too low to cause vaporization of water and volatiles. Part of the incentive for sludge addition during the coking quench cycle is to convert hydrocarbons in the sludge to coke or lighter products, or both, by contact with the relatively hot solid coke bed in the coke drum.

If the sludge contains toxic or hazardous hydrocarbons or organics, failure to thermally convert these materials could leave the resulting coke with dangerous toxic or hazardous materials.

Since the addition of the combination of liquid water and sludge can result in a great deal of cooling effects due to the high heat capacity of liquid water and liquid sludge, a potential exists to cool the solid coke bed below the temperature needed to break down the toxic or hazardous organics before sludge addition is stopped.

Applicant's present invention overcomes the above problem by contacting the hot solid coke bed during the quench cycle with a combination of sludge and oxygen at conditions which will support oxidation or, preferably, combustion of some of the organics in the sludge. The heat generated allows either their complete combustion or thermal cracking to more valuable and less harmful products. Often the combustion will also help remove hydrocarbons which are trapped in the coke bed prior to initiation of the quench cycle.

In the coking processes, sludges have been disposed of in various manners.

West German Offenlegungsschrift, DE 3726206 A1, relates to a coking process in which sludge is added to the process at different locations in the coke drum.

U.S. Pat. No. 1,845,221 relates to the use of waste liquor by-products from coking retorts to quench the coke produced in a retort.

In U.S. Pat. No. 1,973,913 (U.S. Class 202/37), coke which has been removed from a coking oven or coking drum is quenched with polluted wastewater which contains tar acids. After quenching the tar acids remain on the coke and the aqueous materials associated with these acids is vaporized.

U.S. Pat. No. 2,043,646 (U.S. Class 202/16) discloses a process for the conversion of acid sludge into sulfur dioxide, hydrocarbons and coke in a two-step procedure comprising passing sludge into a kiln to produce semi-coke and then passing the semi-coke into a coke drum for conversion into coke product.

U.S. Pat. No. 2,093,588 (U.S. Class 196/61) discloses a process where delayed coking in which liquid materials such as hydrocarbons or water are passed into the vapor portion of the delayed coking zone.

In U.S. Pat. No. 3,164,185 (U.S. Class 208/48) oil-laden water is used during the quench cycle to cool coke in the coke drum while causing the oil to be absorbed by the coke being cooled.

In U.S. Pat. No. 3,284,337 (U.S. Class 208/46) a waste-water stream containing pollutants is used to quench coke in a coke drum.

U.S. Pat. No. 3,917,564 (U.S. Class 208/131), discussed above, discloses a process in which sludges or other organic by-products are added to a delayed coking drum during a water quenching step after the feed coke drum has been stopped and the coke drum has been steamed to remove hydrocarbon vapors. The sludge is added along with the quench water and contacts the solid coke in the coke drum at conditions causing the vaporization of the water contained in the sludge. The organic and solid component of the sludge is left behind through deposition on the coke and removed from the coke drum as part of the solid coke product.

U.S. Pat. No. 4,404,092 (U.S. Class 208/131) discloses a process for increasing the liquid yield of a delayed coking process by controlling the temperature of the vaporous space above the mass of coke in the coke drum by injecting a quenching liquid instead of sludge into the vapor phase within the delayed coking drum. The patent teaches that large amounts of liquid should be added to the vapor space within a delayed coking drum (about 9 percent by weight of the feed).

U.S. Pat. No. 4,501,654 (U.S. Class 208/131) teaches injection of a residual feedstock into the top of a coking drum.

In U.S. Pat. No. 4,552,649 (U.S. Class 208/127) an improved fluid coking process is described where an aqueous sludge which comprises organic waste material is added to a quench ilutriator to cool the coke in the ilutriator and convert at least a portion of the organic waste to vapor compounds which can be recycled to the fluid coking heating zone to increase the temperature of the fluid particles in that zone.

U.S. Pat. No. 4,666,585 (U.S. Class 208/131) relates to the disposal of sludge in a delayed coking process by adding sludge to the coker feedstock and subjecting the feedstock and sludge mixture to delayed coking conditions.

U.S. Pat. No. 4,874,505, Bartilucci et al. relates to a sludge addition to a delayed coking process in which the sludge is segregated into high oil content sludge and high water content sludge. These sludges are introduced into the delayed coking unit during different operating cycles of the coker.

In cases where the sludge is added to the coke drum during the quench cycle, the temperature of the solid coke which the sludge contacts may not be high enough to decompose the sludge to coke and hydrocarbon vapors. While vaporization of the water contained in the sludge by the hot coke might occur, a concern exists that there may not be sufficient conversion or vaporization of the hydrocarbon component of the sludge. If the sludge contains toxic substances, they might not be converted to more acceptable and safer components.

To maintain high coking zone temperatures during the coke producing cycle or to treat coking zone feed, various methods have been used.

U.S. Pat. No. 4,096,097 teaches a process of producing high quality coke in a delayed coking process by adding an effective amount of an oxygen-containing carbonaceous material to the feed which decomposes at the high temperatures of the feed passing into the delayed coking drum. As disclosed in this patent, the oxygen content of the carbonaceous additive should be within the range from about 5 to 50 weight percent and usually no higher than 60 weight percent of the oxygen-containing material added to the feed. The carbonaceous materials which are taught to be effective include coal, lignite, and other materials such as sugar beet waste, sawdust, and other cellulosic wastes.

Another process involves coking hydrocarbon oils by contacting a feed with free oxygen in the presence of an aqueous liquid to produce high quality coke and increase yields of liquid products from the coking reaction. This process is exemplified in U.S. Pat. Nos. 4,370,223 and 4,428,828. Sometimes the entire heat requirements for the process can be provided by the oxidation of the heavy hydrocarbon feed in the aqueous system with free oxygen.

Another process in which oxygen reacts with a residual feed is asphalt blowing. This process is exemplified in U.S. Pat. No. 3,960,704 in which isotropic petroleum coke is produced from a residual feedstock by blowing the feedstock with air until it has an acceptable softening temperature and then subjecting the blown residuum to a delayed coking process.

U.S. Pat. No. 2,347,805 (U.S. Class 190/65) is generally concerned with converting heavy oils to more valuable products and discloses the addition of oxygen or air to the feed passing into a coking still at conditions which inhibit formation of CO, $CO_2$ and other oxygenated bodies to assist in the upgrading of the feed to lighter products and coke.

U.S. Pat. No. 3,702,816 (U.S. Class 208/50) relates to a process for reducing sulfur content of coke obtained from high sulfur resids by hydrogenation of the residual feedstock followed by contacting the partially desulfurized residual in a liquid phase with an oxidizing agent and thereafter passing oxidized charged stock free of extraneous oxidizing agent to a coking zone.

U.S. Pat. No. 4,332,671 (U.S. Class 208/92) relates to a coking process in which the coke is treated by a high temperature calcination with oxygen to reduce its sulfur content.

U.S. Pat. No. 4,051,014 (U.S. Class 208/88) relates to a process for producing coke from sulfur-containing residual feedstocks which involves contacting the feedstock with a peroxy oxidant in the presence of a metal-containing catalyst to oxidize a portion of the hydrocarbon feedstock and subjecting the feedstock to coking conditions to form coke and recover coke product.

It is an object of the invention to reduce the export of waste materials from a refinery or chemical plant by converting generally available sludges in a coking zone during the quench cycle.

It is an additional object of the present invention to convert, at least a part of, a sludge which contains water and organics, and, in other cases, water, liquid organics and solid organic or inorganic materials in a coking zone during the quench cycle to recover useful and valuable products from the sludge.

It is an additional object of the present invention to increase the conversion of any hazardous or toxic materials in sludge materials by processing sludge and oxygen in a coking zone during the quench cycle to convert at least a portion of the wastewater sludge to coke or liquid materials, which can be recovered from the coking process.

DESCRIPTION OF THE DRAWING

The process of the invention is advantageously carried out in conventional delayed coker equipment, elements of which important to the invention are shown in the FIGURE. A heavy bottoms fraction heavier than gas oil in line 16 passes through furnace 17 to be heated, for example to about 900° F. The heated charge is passed by line 18 and valve 19 to the inlet 20 to coke drum 21. The drum is one of a plurality, at least two, of such drums. By operating a battery of such drums in series, the system achieves continuous operation. The hot charge feed is diverted to another drum in the battery when it is desired to discharge coke from a drum which has become full of coke on completion of the reaction stage of its cycle.

In drum 21, the hot oil undergoes an extended period of thermal cracking, often call "soaking." That cracking results in formation of volatile cracked products and coke. The material which is volatile at the temperature of the drum is withdrawn at discharge port 22. Valve 23 being open, the volatile products pass by line 24 to a combination tower for function separation.

Figure 1:
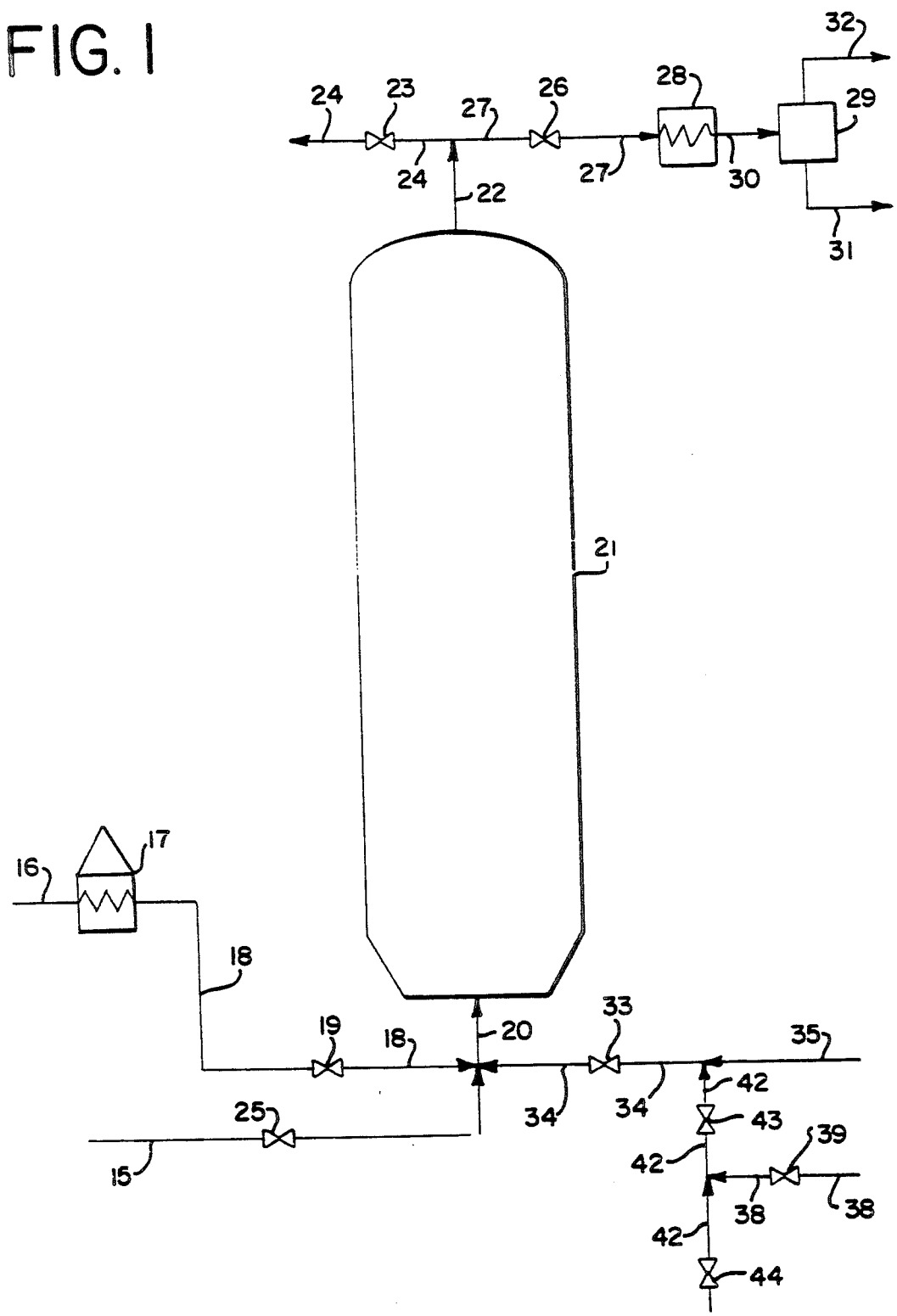

As the reaction stage is concluded, the drum 21 contains a body of porous coke having the pores filled by a heavy oil boiling above the temperature of the drum, usually about 880° F. or higher. At this point the coke-producing cycle is completed and the quench cycle begins. Valve 19 is now closed and steam can be admitted to inlet 20 through line 15 by opening valve 25 in the steam supply line. Steam distillation occurs to remove most of the heavy oil in drum 21. At the end of the first steaming stage, valve 23 is closed, and valve 26 in line 27 to the blow-down system is opened. The rate of steam can then be increased and maintained at this level for a short period of time. Drum effluent during the second steaming stage passes through a condenser 28 and passes as liquid through line 30 to settling basin and skimmer 29. The oil content of the drum effluent rises to the top of the water in skimmer 29 and is removed by usual skimming techniques for recovery and possible reuse in the process. Water from skimmer 29 is transferred by line 31 for reuse.

At the termination of the second steaming state, the bed of coke is at a temperature of about 700° F.–750° F. Valve 25 is now closed and valve 33 is opened to permit entry into the coke drum of a sludge and oxygen mixture via line 34. The sludge can be drawn from a holding tank and can pass through line 42 at a rate controlled by valve 44. Oxygen controlled by valve 39 flows through line 38 for mixture with sludge in line 42. Valve 42 can be used to control the mixture of sludge and oxygen entering the coke drum through inlet 20 via lines 42 and 34.

The sludge and oxygen rates are controlled to preferably allow combustion of at least some of the organics contained in the sludge to supply sufficient heat to help remove volatiles from the coke bed and to convert organics to lighter molecular weight components or coke or both.

In some cases the sludge and oxygen mixture can be added to the coke drum immediately after the conclusion of the reaction stage as a replacement for part or all of the steam which is normally added to the drum during the initial stage of the quench cycle.

After the sludge and oxygen addition is completed, the average coke bed temperature will normally be anywhere from about 500° F. down to 300° F. Water can then be added to the coke drum for final cooling.

Water so admitted is generally converted to steam in cooling the coke and the so-generated steam passes by valve 26 to the blow-down system for recovery. As the coke reaches the temperature of the water, water fills the voids in the bed of coke. After liquid water has been flowed through the coke long enough to ensure adequate cooling, the drum is ready to be decoked.

Decoking proceeds by removal of flanged heads from top and bottom of the drum and cutting the coke by hydraulic jets. The first stage of decoking is accomplished by drilling a bore through the center of the coke to provide a discharge channel. The hydraulic jet, not shown, is returned to the top of the drum after cutting the bore. It is then directed against the tope of the coke while moving in a circular path concentric with and outside the bore. This cuts away lumps of coke which descend with water through the open bottom of the drum and are recovered.

DESCRIPTION OF THE PREFERRED EMBODIMENTS

In a broad embodiment, the present invention relates to a delayed coking process wherein hot feed is maintained at thermal cracking temperature in a coke drum for a period of time to produce cracked vapor which is recovered from the coke drum through a vapor outlet and solid coke which is recovered from the drum after it has been cooled during a quenching cycle, wherein a mixture of oxygen and sludge is added to the solid coke in the coke drum during the quench cycle at thermal treatment conditions to effect oxidation of at least a portion of hydrocarbons contained in the sludge.

In a more preferred embodiment, the present invention relates to a delayed coking process wherein hot feed is maintained at thermal cracking temperature in a coke drum for a period of time to produce cracked vapor which is recovered from the coke drum through a vapor outlet and solid coke which is recovered from the drum after it has been cooled during a quenching cycle, wherein a mixture of oxygen and sludge which contains hydrocarbons is added to the solid coke in the coke drum during the initial stage of the quench cycle at thermal treatment conditions including contacting the mixture of oxygen and sludge with coke having an initial temperature above about 750° F. to effect oxidation of at least a portion of hydrocarbons contained in the sludge and substantially complete consumption of the oxygen by said hydrocarbons.

In an even more preferred embodiment, the present invention relates to a delayed coking process wherein hot feed is maintained at thermal cracking temperature in a coke drum for a period of time to produce cracked vapor which is recovered from the coke drum through a vapor outlet and solid coke which is recovered from the drum after it has been cooled during a quenching cycle, wherein a mixture of oxygen and sludge comprising water, solids, and liquid hydrocarbons is added to the solid coke in the coke drum during the initial stage of the quench cycle at thermal treatment conditions including contacting the mixture of oxygen and sludge with coke having an initial temperature above about 750° F. to effect combustion of at least a portion of hydrocarbons contained in the sludge, vaporization of at least a portion of the water and hydrocarbons in the sludge, conversion of at least a portion of the sludge to coke, and substantially complete consumption of the oxygen by said hydrocarbons.

In the more usual application of the coking process, a delayed coking drum is used. A heavy residual oil is heated in a furnace, passed through a transfer line and then into the coking drum. In the coking drum, which is typically an elongated vessel, the residual feedstock is thermally decomposed to a heavy tar or pitch material which further decomposes with time into solid coke and vapor materials. The vapor materials formed during the coking reaction are recovered from the delayed coking drum and a solid coke material is left behind.

After a period of time the feed to the coke drum is stopped and routed to another drum and the coke-laden drum is then purged of vapors, cooled and opened so that the solid coke inside the drum can be removed.

After the feed to the coke drum is stopped, the quench cycle begins. During the quench cycle, liquids entrained in various lines and in passageways within the solid coke bed are purged from the coke drum through use of combinations of steam and liquid water and the coke bed is cooled to a temperature low enough to safely remove solid coke from the drum.

At this point, the practice of the present invention can be implemented in a number of different ways.

At the initial stage of the quench cycle, the average coke bed temperature can be as high as 800° F. to 850° F. or higher, is normally above about 750° F., and can be as low as 300° F., depending on the type of coking operation being used. Preferably, the average coke bed temperature during the initial stage of the quench cycle is from about 850° F. to 500° F. During the initial stage of the quench cycle steam, water or sludge and oxygen, or combinations of each can be added to the coke drum to initially remove liquids residing in the coke bed.

Steam, generally at a temperature of from about 400° F. to 500° F. can be added to the drum to initially remove liquids in various lines and in passageways located within the solid coke bed. Sludge mixed with oxygen or separate sludge and oxygen streams can then be injected into the coke drum to contact solid coke at thermal treatment conditions described below.

The sludge and oxygen addition can continue until a sufficient amount of sludge has been injected into the coke drum, after which a stream purge or liquid water addition can take place. This is done to cool the coke bed so solid coke may be safely recovered.

In some cases a steam purge followed by liquid water quench may be used before sludge and oxygen are passed into the coke bed. Preferably, the sludge and oxygen are added to the coke drum when the average coke bed temperature is high enough to cause combustion of the hydrocarbon or carbon-containing components of the sludge. The combustion adds additional heat to the coke bed helping to maintain temperatures and assists in conversion of any toxic or hazardous materials in the sludge to more acceptable and safe materials.

A steam purge may also be used at the same time sludge and oxygen are being added to the coke bed during the quench cycle.

Sludge which is introduced along with oxygen into the claimed process typically comprises organic and inorganic waste materials mixed with water and generally is in the form of a mixture of one or more liquids often with solids. Individual sludges, as shown in Table I below, can vary greatly in the concentrations of water, solids and liquid organic materials (such as hydrocarbon oil) depending on the source of the sludge. They can be in the form of suspensions, emulsions, or slurries and generally contain large amounts of water. In some cases the sludge can comprise only liquid materials and in other cases the sludge can comprise a thick slurry of heavy liquids and solid material.

When the individual sludges are combined for addition to the coking zone, the composition of the combined sludge can comprise anywhere from less than one up to about 15 weight percent or more solids, from less than one up to about 15 weight percent or more hydrocarbon oils, and anywhere from a few up to 98 weight percent or more water.

In some cases the sludge can comprise water and hydrocarbon oil with very little, if any, solids. The individual sludges may comprise anywhere from less than one up to 80 or more weight percent solids, from less than one up to 80 or more weight percent of hydrocarbon oils, and anywhere from a few up to 98 weight percent or more water.

The oil or organic material may be solid, semi-solid or a liquid material and is generally a hydrocarbonaceous material. The solid may comprise organic or inorganic material and, in some cases, can comprise both. Preferably, the aqueous sludge is an industrial sludge derived from wastewater treatment plants of petroleum refineries or petrochemical plants comprising hydrocarbonaceous materials.

Table I below shows sludge production and solids and hydrocarbon oils contents (the remaining material being water) for aqueous wastewater sludges found in a typical refinery producing a broad range of refinery products:

TABLE I

| Aqueous Wastewater Sludge Description | Solids Wt % | Oil Wt % | Pounds Per Day | |
|---|---|---|---|---|
| API Separator Bottoms | 3.9 | 2.5 | 6,600 | |
| Slop Oil Emulsions | — | 84.0 | 3,280 | |
| Leaded Tank Bottoms | 6.1 | — | 30 | |
| Unleaded Tank Bottoms | 66.0 | 12.0 | 3,030 | |
| Heat Exchange Sludge | 17.0 | — | 6 | |
| Oily Waste | — | 7.7 | 55 | |
| MEA Reclaimer Sludge | 6.2 | 0.2 | 99 | |
| ASP Sludge from Digester | 2.0 | 0.34 | 22,600 | |
| Average | 7.6 | 9.4 | 35,700 | Total |

The above-described sludge is added to the coking zone during the quench cycle along with oxygen at thermal treatment conditions which include a temperature high enough to cause oxidation of at least a part of the sludge.

Thermal treatment conditions also can include the contact of sludge with oxygen at sufficiently high temperatures to cause at least a partial oxidation of the sludge followed by injection of the sludge and oxygen into the coke drum for further contact with solid coke during the quench cycle to cause additional oxidation of the sludge or the materials it contacts, or both, within the coking zone. If thermal treatment conditions are regulated so as to cause oxidation of some of the sludge prior to its contact with solid coke in the coke drum during the quench cycle, the sludge or oxygen would preferably be preheated prior to or during mixing with each other so as to reach a sufficiently high temperature to cause oxidation or combustion of the sludge to occur.

Thermal treatment conditions include sufficiently high temperatures anywhere from above 300° F., and preferably above 500° F., up to 950° F. or higher which will primarily cause oxidation of hydrocarbons contained within the sludge. Thermal treatment temperatures generally represent the temperature of the material that the sludge and oxygen mixture contacts when injected into the coking zone during the quench cycle. These materials can be solid coke, liquid or vapor derived from the feed. They generally are at a temperature above about 700° F. in the coking zone when the quench cycle begins. Preferably, thermal treatment conditions include consumption (through oxidation) of essentially all the oxygen injected with the sludge into the coking zone and include a temperature anywhere preferably from around 700° F. up to or higher than 900° F. At higher temperatures the oxidation of hydrocarbon in the sludge will cause combustion and production of water and carbon dioxide products from the materials combusted in the sludge. The thermal treatment conditions preferably will also cause any hydrocarbon materials or toxic materials within the sludge which are cokeable to be produced into solid coke and lighter more valuable and less toxic hydrocarbons.

Thermal treatment conditions in a preferred sense include both high temperature oxidation or combustion coupled with the resulting conversion of heavier hydrocarbons or toxic materials contained in the sludge into relatively harmless or inert coke-like materials and more valuable and less environmentally hazardous light hydrocarbons or lighter materials which can be recovered from the coking zone.

Preferably, a sludge and oxygen mixture is injected into the coking zone at conditions to encourage maximum combustion of sludge during the quench cycle.

The amount of oxygen mixed with the sludge which is injected into the coking zone can vary depending on the hydrocarbon type and content of the sludge being injected, the temperature of the sludge being injected, and the temperature of the hydrocarbon or coke material that the sludge contacts within the coking zone.

Approximately 24 standard cubic feet of oxygen per pound of hydrocarbon contained within the sludge is a useful gauge of the amount of oxygen which can be used. A preferred range is anywhere from around 5 to about 100 or more standard cubic feet of oxygen per pound of hydrocarbon contained in the sludge. In cases where a large amount of water is present in the sludge, coker recycle liquids may be mixed with the sludge to help preheat the sludge before it enters the coking zone. In these cases sludge may be pretreated by removing some of the water by filtering, centrifuging or similar operations.

In some cases where the sludge contains no cokeable materials, thermal treatment conditions include vaporization of the sludge, or thermal decomposition of the sludge into vaporous materials along with oxidation of at least a portion of the sludge.

The sludge on a water-free basis, in an amount of from about 0.5 to 15 weight percent or more of the coke bed can be added to the delayed coker.

The amount of sludge and oxygen added during the quench cycle and the time over which addition takes place should be regulated so as to produce acceptable coke and liquid products while not unduly extending the quench cycle so as to interfere with the other normal delayed coking cycles of operation.

The time over which sludge and oxygen are injected during the quench cycle can be as short as a few minutes to as long as many hours.

In many cases sludge and oxygen addition occurs until a predetermined average coke bed temperature is achieved. Generally, sludge and oxygen addition will stop when the average coke bed temperature is about 300° F. or less. Preferably, sludge addition will stop when the average bed temperature is below about 500° F.

After sludge addition is stopped, steam or liquid water or combinations of both can be added for additional purging or cooling of the coke.

The oxygen added to the coke drum during the quench cycle may be mixed with the sludge in the coke drum or may be mixed with the sludge before the mixture is added to the coke drum. The oxygen may be in a purified or enriched form (high purity oxygen) or may be in the form of air.

EXAMPLE

In this example comparisons were made on four simulated cases using the assumptions described. A delayed coker was assumed to have a coke drum feed rate of about 7000 barrels per day of residual feed which produced about 350 tons of coke from each drum per day. The average temperature of the coke bed was at about 800° F. at the beginning of the quench cycle.

In each of the cases, during the initial stage of the quench step, the coke bed was assumed to be steamed for about 10 minutes at a steam rate of about 10,000 lb./hour to help remove heavy liquid oil contained in the drum boiling at a temperature above the coke bed temperature and to keep all lines open and channels in the coke bed open.

After the steaming was stopped, water, sludge, or sludge and air were added to the coke drum depending on the assumption selected. The sludge used for this illustrative example had the average composition shown in Table I (7.6 wt.% solids 9.4 wt.% oil, and the remainder water). When air was mixed with sludge, it was first injected into the liquid sludge stream and the mixture was then added to the lower part of the coke drum during the initial stage of the quench cycle.

At the end of three hours, the average coke bed temperature was calculated for each of the cases shown in Table II to illustrate the effects on the process of using the invention claimed herein.

TABLE II

| | Base Case | Case A | Case B | Case C |
|---|---|---|---|---|
| Quench Material | Water | Sludge | Sludge + Air | Sludge + Air |
| Volumetric Addition Lbs./Hr. | 28,777 | 34,000 | 34,000 | 34,000 |
| Average Coke Bed Temperature After 3 Hours | 400° F. | 400° F. | 646° F. | 524° F. |
| Air Addition Rate, SCFH | 0 | 0 | 362,000 | 181,000 |
| Equivalent O$_2$ Addition Rate, SCFH | 0 | 0 | 76,065 | 38,032 |
| Hydrocarbon In Sludge Combusted, Lbs. Hydrocarbons | 0 | 0 | 665 | 332 |

As can be seen from the above illustrative Examples, Cases B and C. in which sludge plus air was added to the coke drum during the initial stages of the quench step, had higher average coke bed temperatures of 646° F. and 524° F., respectively, than the average coke bed temperature of 400° F. for Cases A and B. In Case B sludge alone was added to the coke drum during the initial stage of the quench cycle. In Case A only water was added during the initial stage of the quench cycle.

Some of the advantages of the combustion or oxidation that occurs when adding oxygen to the sludge during the quench cycle are:

(1) Increased amounts of hydrocarbons are driven off the solid coke and the sludge resulting in increased liquid production;
(2) Normally liquid materials in the solid coke can be driven off resulting in a more valuable coke product due to decreased volatile content;
(3) More sludge can be processed during the quench cycle because a higher temperature coke bed can be maintained; and
(4) More complete conversion of any hazardous components in the sludge to harmless materials can result because of the high temperature resulting from combustion of sludge.

That which is claimed is:

1. A delayed coking process wherein hot feed is maintained at thermal cracking temperature in a coke drum for a period of time to produce cracked vapors which are recovered from the coke drum through a vapor outlet and solid coke which is recovered from the drum after it has been cooled during a quenching cycle, wherein feed to the coke drum is stopped and thereafter oxygen and sludge are added to the solid coke in the coke drum during the quench cycle at thermal treatment conditions to effect oxidation of at least a portion of hydrocarbons contained in the sludge.

2. Claim 1 in which the sludge comprises water, solids, and liquid hydrocarbons.

3. Claim 1 in which thermal treatment conditions include contacting the oxygen and sludge with coke having an initial temperature above about 750° F. to effect combustion of at least a portion of hydrocarbons contained in the sludge, vaporization of at least a portion of the water and hydrocarbons in the sludge, conversion of at least a portion of the sludge to coke, and substantially complete consumption of the oxygen by said hydrocarbons.

4. Claim 3 in which thermal treatment conditions include conversion of substantially all the hydrocarbons contained in the sludge to lighter vapors and coke.

5. Claim 1 in which the addition of sludge and oxygen to the coke drum is stopped when the temperature of the coke in the drum is below that which will support combustion of hydrocarbons contained in the sludge.

6. Claim 1 in which the addition of sludge and oxygen to the coke drum is stopped after the coke it contacts is at a temperature below about 500° F.

7. Claim 6 in which said temperature is below about 300° F.

8. Claim 3 in which thermal treatment conditions include contacting a mixture of oxygen and sludge with coke having an initial temperature above about 800° F.

9. A delayed coking process wherein hot feed is maintained at thermal cracking temperature in a coke drum for a period of time to produce cracked vapors which are recovered from the coke drum through a vapor outlet and solid coke which is recovered from the drum after it has been cooled during a quenching cycle, wherein feed to the coke drum is stopped and thereafter a mixture of oxygen and sludge which contains hydrocarbons is added to the solid coke in the coke drum during the initial stage of the quench cycle at thermal treatment conditions including contacting the mixture of oxygen and sludge with coke having an initial temperature above about 750° F. to effect oxidation of at least a portion of hydrocarbons contained in the sludge and substantially complete consumption of the oxygen by said hydrocarbons.

10. Claim 9 in which the sludge comprises water, solids, and liquid hydrocarbons.

11. Claim 9 in which thermal treatment conditions include an initial coke temperature above about 800° F. to effect combustion of at least a portion of hydrocarbons contained in the sludge, vaporization of at least a portion of the water and hydrocarbons in the sludge, conversion of at least a portion of the sludge to coke, and substantially complete consumption of the oxygen by said hydrocarbons.

12. Claim 11 in which thermal treatment conditions include conversion of substantially all the hydrocarbons contained in the sludge to lighter vapors and coke.

13. Claim 9 in which the addition of the mixture of sludge and oxygen to the coke drum is stopped when the temperature of the coke in the drum is below that which will support combustion of hydrocarbons contained in the sludge.

14. Claim 9 in which the addition of the mixture of sludge and oxygen to the coke drum is stopped after the coke it contacts is at a temperature below about 500° F.

15. Claim 14 in which said temperature is below about 300° F.

16. A delayed coking process wherein hot feed is maintained at thermal cracking temperature in a coke drum for a period of time to produce cracked vapors which are recovered from the coke drum through a vapor outlet and solid coke which is recovered from the drum after it has been cooled during a quenching cycle, wherein feed to the coke drums is stopped and thereafter a mixture of oxygen and sludge comprising water, solids, and liquid hydrocarbons is added to the solid coke in the coke drum during the initial stage of the quench cycle at thermal treatment conditions including contacting the mixture of oxygen and sludge with coke having an initial temperature above about 750° F. to effect combustion of at least a portion of hydrocarbons contained in the sludge, vaporization of at least a portion of the water and hydrocarbons in the sludge, conversion of at least a portion of the sludge to coke, and substantially complete consumption of the oxygen by said hydrocarbons.

17. Claim 16 in which the addition of the mixture of sludge and oxygen to the coke drum is stopped when the temperature of the coke in the drum is below that which will support combustion of hydrocarbons contained in the sludge.

18. Claim 16 in which the addition of the mixture of sludge and oxygen to the coke drum is stopped after the coke it contacts is at a temperature below about 500° F.

19. Claim 16 in which said temperature is below about 300° F.

20. Claim 16 in which thermal treatment conditions include contacting the mixture of oxygen and sludge with coke having an initial temperature above about 800° F.

* * * * *